W. SAUVE.
MEANS FOR THINNING OIL ON CLUTCH DISKS.
APPLICATION FILED JAN. 13, 1917.
1,237,561.
Patented Aug. 21, 1917.
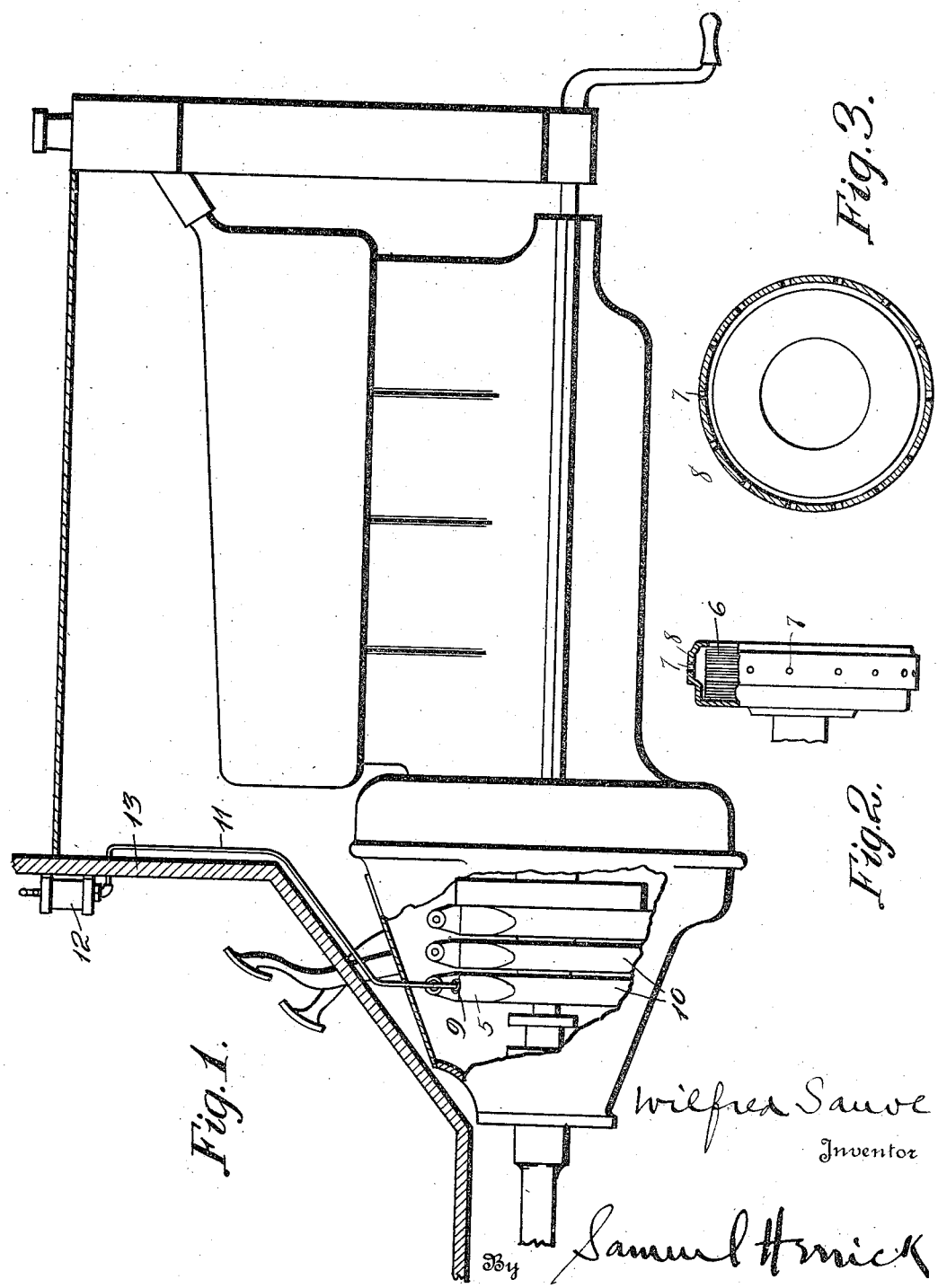

UNITED STATES PATENT OFFICE.

WILFRED SAUVE, OF MOXEE CITY, WASHINGTON.

MEANS FOR THINNING OIL ON CLUTCH-DISKS.

1,237,561.  Specification of Letters Patent. Patented Aug. 21, 1917.

Application filed January 13, 1917. Serial No. 142,242.

*To all whom it may concern:*

Be it known that WILFRED SAUVE, a citizen of the United States of America, residing at Moxee City, in the county of Yakima and State of Washington, has invented certain new and useful Improvements in Means for Thinning Oil on Clutch-Disks, of which the following is a specification.

This invention relates to a means for thinning oil on clutch disks and particularly clutches of the disk type such as are used on Ford automobiles, for example.

In cold weather it is difficult to crank a Ford engine by hand for the reason that the oil between and upon the disks of the clutch becomes so thick and stiff in cold weather that the disks of the clutch tend to turn together. It is the primary object of the present invention to thin and loosen this oil.

Further objects and advantages of the invention will be set forth in the detailed description which now follows:

In the accompanying drawing:

Figure 1 is a view partly in side elevation and partly in section through the hood and dash of a Ford automobile.

Fig. 2 is a side elevation of the brake drum with the brake band removed, and

Fig. 3 is a transverse, vertical section through the brake drum.

Like numerals designate corresponding parts in all of the figures of the drawing.

As is well known the Ford clutch comprises a plurality of disks 6, the frictional engagement between which serves to drive the car. In cold weather the oil upon these disks becomes so thick that it is extremely difficult to crank the engine by hand and to remedy this I bore holes 7 at intervals in the drum 8 and I form an opening 9 in the brake band 10, and lead to the opening 9 a pipe 11 from a reservoir 12 that is secured to the dash 13 of the automobile. The oil cup 12 is designed to receive gasolene and when gasolene is fed from the oil cup through pipe 11 and opening 9 to openings 7 in the brake drum 8 it finds its way to the disks 6 and thins the oil upon said disks to such an extent as to greatly relieve the adhesion between the disks and render it possible to crank the engine by hand without difficulty.

From the foregoing description it will be seen that simple and efficient means are herein provided for accomplishing the result sought but it is to be understood that the invention is not limited to the precise construction set forth but includes within its purview such changes as fairly come within the spirit of the appended claims.

Having described my invention what I claim is:—

1. The combination with an automobile having a clutch of the disk type, of a member constituting a housing for the disks of the clutch and means permanently mounted in position upon a part of the automobile for feeding gasolene to the disks of the clutch from a point outside of said member.

2. The combination with an automobile having a clutch of the disk type, of a reservoir accessible from the driver's seat and adapted to receive gasolene and a pipe leading from said reservoir and arranged to discharge upon the disks of said clutch.

3. The combination with an automobile having a clutch of the disk type and having a brake drum surrounding said disks, of a brake band upon said brake drum and orifices formed in said brake drum for the passage of an oil thinning agent through said brake drum to said disks, said brake band having an opening formed therethrough for the passage of said oil thinning agent.

4. The combination with an automobile having a clutch of the disk type, of a brake drum surrounding said disks, a brake band about said brake drum, an opening formed through the brake band, a plurality of openings formed through the brake drum, a reservoir mounted upon the dash of the automobile and a pipe leading from said oil cup to the opening of the brake band.

In testimony whereof I affix my signature in the presence of two witnesses.

WILFRED SAUVE.

Witnesses:
 JULIEN SAUVE,
 H. H. LA BERGE.